No. 886,356. PATENTED MAY 5, 1908.
F. H. DE VEULLE.
GRADUALLY VARIABLE SPEED GEAR FOR CYCLES AND THE LIKE.
APPLICATION FILED MAR. 2, 1907.
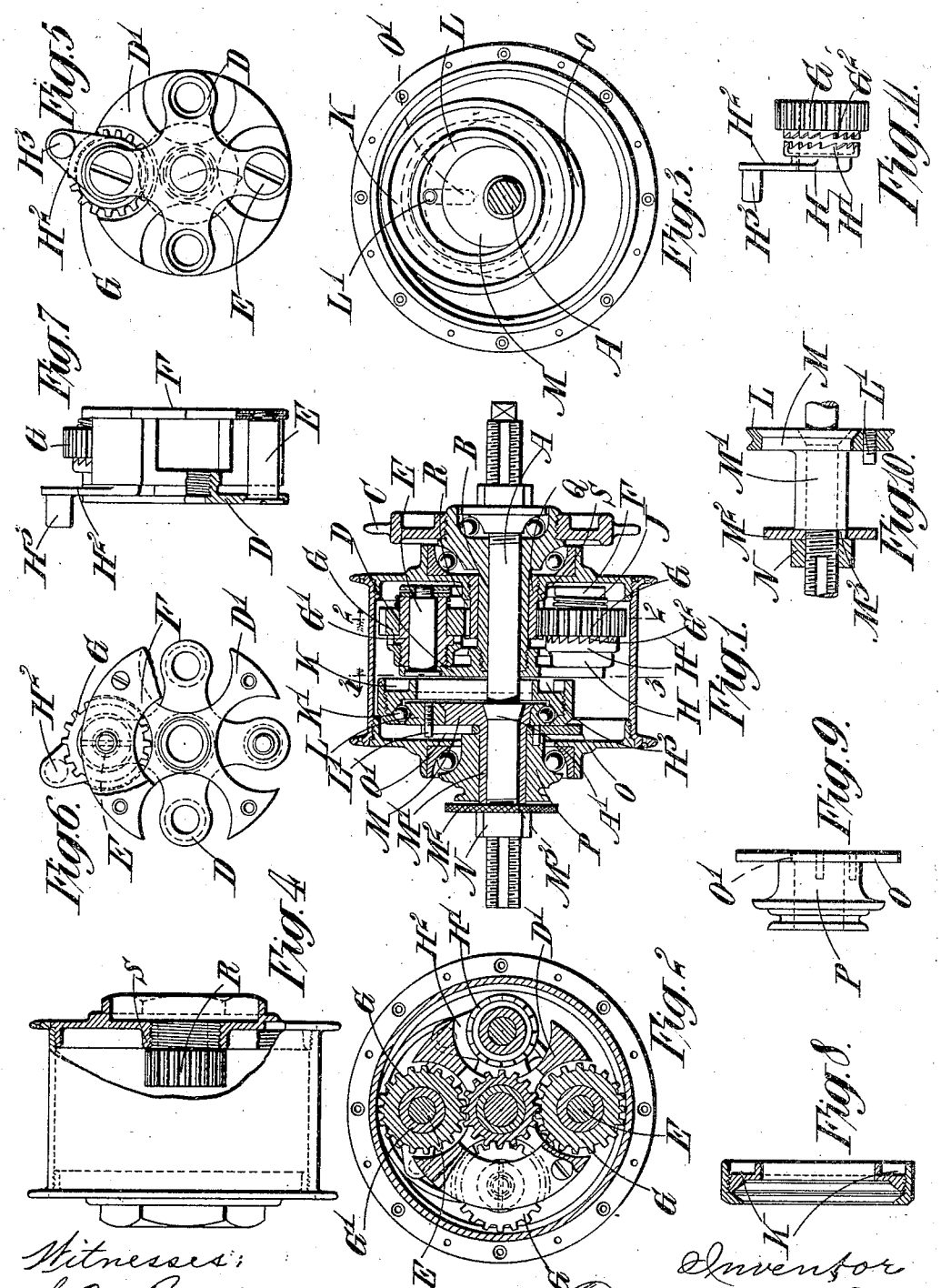

UNITED STATES PATENT OFFICE.

FREDERICK HENRY DE VEULLE, OF HANDSWORTH, BIRMINGHAM, ENGLAND, ASSIGNOR TO E. M. BOWDEN'S PATENTS SYNDICATE, LIMITED, OF LONDON, ENGLAND, A CORPORATION OF ENGLAND.

GRADUALLY-VARIABLE SPEED-GEAR FOR CYCLES AND THE LIKE.

No. 886,856.

Specification of Letters Patent.

Patented May 5, 1908.

Application filed March 2, 1907. Serial No. 360,127.

*To all whom it may concern:*

Be it known that I, FREDERICK HENRY DE VEULLE, a subject of the King of Great Britain, residing at Handsworth, Birmingham, in the county of Warwick, England, have invented certain new and useful Improvements in or Relating to Gradually-Variable Speed-Gears for Cycles and the Like, of which the following is a specification.

This invention relates to gradually variable speed gearing for cycles and the like, particularly to variable gearing comprising an epicyclic train with the planet pinions mounted on overrunning clutches in which the planet pinions can be advanced through a varying angle at each revolution by means of a cam engaged by an arm carried by each planet pinion.

The chief object of the invention is to provide a construction in which a gearing of this type can be contained within a cycle hub of practically the same dimensions as that which contains a gearing providing two or three speeds.

A further object is to provide a means for adjusting the range of the gearing when the hub is being built up, and for altering that adjustment when necessary.

In a gearing of this type in which a sun pinion and planet pinions only are used, difficulty lies in constructing a gearing of suitable dimensions owing to the fact that the sun pinion has to be attached to the hub shell, while the planet pinions and their carrier have to be attached to the driving sleeve or member which carries the chain sprocket. The construction employed in this case obviates these difficulties in a simple manner while the hub is easy to manufacture.

In the accompanying drawings:—Figure 1 is a longitudinal section of a gradually variable speed gearing constructed in accordance with this invention; Fig. 2 is a section approximately on the line 2—2 in Fig. 1, with parts shown in elevation; Fig. 3 is a view on the line 3—3 showing the arrangement of the actuating disk and eccentrics. Fig. 4 is an elevation, partly in section, of the hub; Fig. 5 is a detail view of the planet pinion carrier; Fig. 6 is a view of the gear members looking in the opposite direction; Fig. 7 is an elevation of the gear and planet pinion carrier. (In these last three views the carrier $H^2$ is shown raised for the sake of clearness, a position which it never occupies when in operation). Fig. 8 is a section of the ring; Fig. 9 is an elevation of the movable cone and disk used for varying the gear; Fig. 10 is an elevation of the normally fixed eccentric with the movable eccentric shown in section, while Fig. 11 shows a planet pinion and its sleeve, separated.

Like letters indicate like parts throughout the drawings.

In this construction, on the fixed spindle A is arranged loosely the driving sleeve B. This carries at its outer end the chain sprocket C while on the inner end is screwed the planet pinion carrier D. In this are arranged the pins E which form the pivots of the planet pinions which pins are supported on the side nearest the chain sprocket C by a ring F. This ring F is attached to the arms $D^1$ forming part of the carrier D and extending between the planet pinions G. On each of the pins is arranged a sleeve $G^1$ forming the center of each planet pinion. On this sleeve is arranged the planet pinion G which in the present construction has on one face of it beveled clutch jaws $G^2$. Screwed on the sleeve $G^1$ is a clutch sleeve H which has similar clutch jaws $H^1$ adapted to engage those $G^2$ on the planet pinion. Each sleeve H has a projecting arm $H^2$ carrying a stud or roller $H^3$. At the back of each planet pinion is a coil spring J which lies between the planet pinion and the ring F. The spring J in each case tends to keep the clutch jaws $G^2 H^1$ in engagement. All the studs $H^3$ lie in an annular recess formed in a two part ring K. This ring is mounted on ball bearings $K^1$ on an eccentric L. The eccentric L is in turn mounted upon an eccentric M the eccentricities of the two eccentrics being equal. This being the case, when the maxima of the eccentrics are brought opposite to one another the ring K will be brought concentric with the spindle A, but by rotating the eccentric L on the eccentric M the amount of eccentricity can be varied in the well known manner. Similarly by rotating the central eccentric M in relation to the outer one the same effect is obtained. The eccentric M is mounted upon the spindle A and is brought up against a cone $A^1$ formed thereon and is held up against the cone by the lock nut N. The eccentric M is formed with a sleeve M¹ which lies along the spindle and is attached to a milled disk M² by means of a slot in the disk engaging a nose M³ on the sleeve. By means of the milled disk M² the eccentric M can be rotated, this rotation being used merely for primary adjustment in setting up the gearing. In this way if the whole range of movement of the eccentric L be not used, the range of speeds obtainable can be varied to suit the user and when the desired range is obtained the central eccentric is locked by means of the nut N.

Alongside the eccentric lies a plate O which has in it a slot O¹ engaged by a pin L¹ carried by the outer eccentric L. Rotating the disk O therefore rotates the eccentric L and causes the eccentricity of the ring K to be varied. The disk O is pinned to the cone P which can be rotated through any desired arc by means of mechanism connected up to a control lever within reach of the user.

On the cone P is a ball bearing on which the hub shell is mounted. The hub shell at the other side is mounted on the driving sleeve B and has screwed into a flange B formed on it a sleeve Q on which is cut the sun pinion R engaged always by the planet pinions G. The driving sleeve B is supported on the spindle A in ball bearings, as shown.

The operation of the gearing is as follows:— Assuming the eccentrics to be with their maxima in opposition so that the ring K is concentric, rotation of the chain sprocket rotates the planet pinion carrier in the same direction, and consequently rolls the planet pinions on the sun pinion. The planet pinions therefore have a tendency to rotate idly on their sleeves, but this is prevented by the overrunning clutches G², H¹, so that the sun pinion is drawn round with the planet pinion carrier at the same angular velocity as the chain sprocket. This is the normal gear. Moving the eccentric L by rotation of the disk O causes the ring K to become slightly eccentric. At each rotation the arms H² rise and fall causing at each rise the planet pinions G to be advanced through a small angle, while at each fall the clutches G², H¹, overrun. Therefore at each revolution each planet pinion is geared up slightly, so that the sun pinion is rotated at a higher angular velocity. The amount of advance given to the planet pinions, as will be seen, can be determined by the amount of eccentricity imparted to the ring K which is under the control of the user in the manner above described.

Obviously, in place of the beveled jaw clutches H¹, G², any suitable overrunning clutch, such as a roller, ball, or ratchet clutch may be employed for the mounting of the planet pinions G on their sleeves G¹. If desired, the milled disk M² and the rotatable cone P may be marked so as to facilitate the building up of the hub and setting of the gearing.

What I claim as my invention and desire to secure by Letters Patent is:—

1. A gearing in which the speed ratio of the driving and driven elements is gradually variable in combination with a cycle hub driven thereby and arranged to inclose the working parts of the said gearing.

2. In a gradually variable gearing the combination with a cycle hub of a driven planet pinion carrier, planet pinions supported on said carrier, a sun pinion attached to said hub and gearing with said planet pinions and means for advancing the planet pinions, said hub inclosing all the aforesaid working parts.

3. In a gradually variable gearing the combination with a cycle hub of a driven planet pinion carrier, overrunning clutches on said carrier, planet pinions mounted on said clutches, a sun pinion attached to said hub and gearing with said planet pinions and means for advancing the planet pinions relatively to the sun pinion, said hub inclosing all the aforesaid working parts.

4. In a gradually variable gearing the combination with a cycle hub of a driven planet pinion carrier, overrunning clutches on said carrier, planet pinions mounted on said clutches, a sun pinion attached to said hub and gearing with said planet pinions, a guide, members connected to the planet wheels through said overrunning clutches and adapted to engage with the guide, and means for adjusting the position of the guide, said hub inclosing all the aforesaid working parts.

5. In a gradually variable gearing the combination with a cycle hub of a driven planet pinion carrier, overrunning clutches on said carrier, planet pinions mounted on said clutches, a sun pinion attached to said hub and gearing with said planet pinions, a guide, members connected to the planet wheels through said overrunning clutches and adapted to engage with the guide, and a double eccentric supporting said guide, said hub inclosing all the aforesaid working parts.

6. In a gradually variable gearing the combination with a cycle hub of a driven planet pinion carrier, overrunning clutches on said carrier, planet pinions mounted on said clutches, a sun pinion attached to said hub and gearing with said planet pinions, a guide, members connected to the planet wheels through said overrunning clutches and adapted to engage with the guide, a double eccentric for supporting said guide, means for moving and locking one eccentric for adjusting the speed range of the gearing, and means for moving the other eccentric for changing the gear, said hub inclosing all the aforesaid working parts.

7. In a gradually variable gearing the combination with a cycle hub, of a fixed spindle A, a driven sleeve B surrounding said spindle, a planet pinion carrier D F attached to said sleeve, planet pinions G supported on both sides by said carrier, overrunning clutches H¹ G², members such as H² H³ connected through said overrunning clutches to the pinions G, a two-part ring K adapted to guide said members H² H³, a double eccentric L M, on which said ring K is mounted, the sleeve M' adapted to rotate the said eccentric M on the fixed spindle A, the nut N for locking said sleeve on a cone A¹ on said fixed spindle, and the cone P being adapted to rotate said eccentric L, said hub inclosing all the aforesaid working parts.

8. In a gradually variable gearing the combination with a cycle hub of a driven planet pinion carrier, planet pinions supported on both sides on said carrier, a sun pinion attached to said hub and gearing with said planet pinions and means for advancing the planet pinions, said hub inclosing all the aforesaid working parts.

9. In a gradually variable gearing the combination of a driving member, a driven member, means for advancing said driven member with respect to said driving member, members operating said means and a guide for said members, a double eccentric for supporting said guide, means for moving one eccentric for adjusting the speed range of the gearing and means for moving the other eccentric for changing the gear.

10. In a gradually variable gearing the combination with a cycle hub and a fixed spindle for supporting said hub of a driving member, a driven member, means for advancing said driven member with respect to said driving member, members operating said means and a guide for said members, an eccentric for supporting said guide, there being a cone on said fixed spindle adapted to fit a conical recess in said eccentric and a nut to lock said eccentric against said cone.

In testimony whereof I have signed my name to this specification in the presence of two subscribing witnesses.

FREDERICK HENRY DE VEULLE.

Witnesses:
 B. G. HODGSON,
 ERNEST HARKER.